UNITED STATES PATENT OFFICE 2,417,611

METHOD OF MAKING INSOLUBLE STARCH PRODUCT

Gordon G. Pierson, Lansdale, Pa., assignor to Perkins Glue Company, Lansdale, Pa., a corporation of Delaware No Drawing. Application June 15, 1943, Serial No. 490,918

6 Claims. (Cl. 260—209)

The present invention relates to a novel starch product of advantageous properties, and to the method of making it, and more particularly it relates to the production of a starch product comprising starch grains which will not burst, gelatinize, or swell appreciably upon exposure to water, and which is, therefore, especially applicable for use as a filling material for paints, adhesives, plastics and the like.

Heretofore, when the use of an organic filling material has been required, ground wood or wood flour has often been employed, but this material cannot be reduced to the desired extreme fineness without excessive cost. In addition, it absorbs considerable amounts of water and swells when wet so that it is practically impossible by its use to form smooth, continuous, and free-flowing dispersions in aqueous or even in non-aqueous carriers. Other organic fillers, such as nut shells and cotton flock, have been employed, but these also possess disadvantages.

One object of the present invention is to provide a finely divided, substantially insoluble and inert, white or translucent, soft starch product which is applicable for various uses in the industries, for example, as a filling material.

A further object of the invention is to provide a starch product comprising unburst starch grains which will not burst or gelatinize to any significant extent or be made appreciably soluble upon exposure to water, for example, by boiling in water or alkaline or other aqueous solution, even though such treatment be continued for some hours.

Other objects, including the provision of a method by which the starch product of the aforesaid advantageous properties may be economically and easily prepared, will be apparent from a consideration of this specification and the claims.

In accordance with the present invention, unburst starch is rendered substantially inert by treatment with formaldehyde and acid under conditions which prevent alteration of the original shape of the starch grains, that is, the grains will not have been burst or gelatinized and the product will comprise a finely divided powder similar in appearance and feel to the starch treated. The product obtained as the result of the process comprises unburst starch grains insolubilized by reaction with formaldehyde and acid and characterized by their ability to withstand exposure to water without appreciably bursting, gelatinizing or swelling. In addition to its use as a filling material, the product may be used as an antiseptic powder since formaldehyde will be liberated therefrom, particularly when the product is damp.

It is known that the treatment of burst starch with formaldehyde and an acid will result in a more or less insoluble material. In such a process, the starch-water gelatinized product resulting from the bursting of the starch grains when treated with substantial quantities of formaldehyde under fairly strong acid conditions is converted into an exceedingly stiff, irreversible jelly. After drying, the starch-formaldehyde jelly becomes a hard, horny, and more or less insoluble mass which may with great effort and cost be ground to a fine powder. In contrast to such a product and process, the starch treated in accordance with this invention is unburst starch and the conditions of treatment are controlled so that the starch grains remain in their unburst condition.

The process of the present invention involves agitating unburst starch grains in the presence of formaldehyde and acid to cause the formaldehyde and acid to be distributed throughout the starch grains and to be absorbed thereby and heating said mixture to cause a reaction between the starch and formaldehyde to form a product of the properties herein set forth, the conditions of the treatment inhibiting the bursting of the starch grains.

The starch treated may be any unburst starch, such as wheat, rye, cassava, potato, rice, and corn. Preferably, the starch employed is a raw or unmodified starch, but if desired, any modified starch product, the grains of which are substantially unburst, may be used.

The unburst starch may be treated by gaseous formaldehyde and acid or by an aqueous solution of the formaldehyde and acid; or the formaldehyde or the acid may be gaseous and the other reactant in solution. In the case a solution is employed, the amount of water associated with the formaldehyde and acid is limited so that the moisture content of the mixture of the starch and the formaldehyde and acid will be below that which will cause the starch grains to burst during the treatment. In general, the water content will be below about 20% of the weight of the starch. If the water content exceeds about 20%, greater care must be taken during the process to prevent bursting of the grains, and, in general, the smaller the amount of water present, the more satisfactory will be the process to produce the type of product desired. Usually the amount of water present will be between about 5% and about 16%.

The amount of formaldehyde employed will be sufficient to render the starch substantially insoluble and inert in boiling water and the amount employed can be varied widely. Generally, at least about 1% and less than about 15% of formaldehyde (on the dry basis) of the weight of the starch will be employed. Preferably, the amount employed will be between about 3% and about 10%. Hence, when a solution of formaldehyde is used, a commercial formalin solution containing about 37% formaldehyde will be employed in an amount between about 8% and 25%.

The acid functions to catalyze the reaction and is employed in an amount required to give a pH of about 2.5 to 4.0 when the starch, formaldehyde, and acid mixture is suspended in distilled water. The use of an amount of acid to give a pH in aqueous solution of about 3.0 is preferred, and a non-bursting starch product can be prepared which will show less than about 5% of soluble matter after eighteen hours of immersion in boiling water. The use of hydrochloric acid is preferred, although any other acid which will give the desired pH may be employed, for example, when the process is to be conducted in the presence of water, sulphuric or phosphoric acid may be used, and the acid may be added to the formalin solution or added as a separate solution.

Whether the process is carried out in the presence or absence of water, the starch is agitated to distribute the chemicals throughout the starch and to cause them to be absorbed thereby. When gaseous formaldehyde and acid are employed, the process is conducted in a closed drum. In the case of the treatment of the starch in the presence of water, the solution of formalin containing the acid is advantageously sprayed onto the starch in a manner to distribute it through the starch as uniformly as possible, and the treated starch may be rubbed through a screen or passed through a rubbing mill to break up any lumps and to distribute the solution over the starch grains as evenly as possible. This treatment may also be employed when gaseous formaldehyde and acid are used if there are any lumps in the starch being treated.

In order to insure a uniform product, the starch after treatment with the formaldehyde and acid may, if desired, be allowed to stand for several hours so that the solution and/or vapors may further distribute themselves.

The treated starch is subjected to a heat-treatment by heating it at an elevated temperature sufficient to cause the reaction, generally at a temperature of at least about 140° F. The heating is advantageously accomplished by spreading the treated material in relatively thin layers in the trays of an oven. A temperature somewhat higher than 140° F. is preferred since the time required will be shortened, and usually a temperature of about 150° F., or higher, more specifically about 180° F. to 200° F., will be employed. The upper limit of temperature is not critical so long as it is below that at which the starch will be scorched or otherwise damaged. In most instances, however, the temperature employed will not exceed about 220° F. The time of treatment is sufficient to complete the reaction and will be dependent to an extent upon the temperature, and possibly on the degree of dryness of the mixture. An indicated above, the reaction proceeds faster and more effectively at the higher temperatures and in any case, the heat treatment is continued until the starch product has become substantially insolubilized in water. The treatment may extend from an hour or two to a day or two. For example, when a temperature of about 200° F. is employed, the time of treatment may be in the neighborhood of two hours.

After the heat-treatment, the treated starch is removed from the oven and is cooled and may, if desired, be neutralized with powdered soda ash or other alkali.

The following examples are illustrative of the process of the present invention, and result in a starch product which comprises unburst starch grains which will not appreciably burst, gelatinize or swell when exposed to the action of boiling water:

*Example 1*

One hundred pounds of ordinary powdered corn starch having the brand name of Buffalo and manufactured by the Corn Products Refining Company is rapidly agitated in a mixer. While the starch is being agitated, twelve pounds of formalin solution (37%) containing one-tenth pound of concentrated hydrochloric acid is sprayed into the starch in a manner to distribute the solution as uniformly as possible. The mixture is then rubbed through a screen or passed through a rubbing mill to break up any damp lumps and to distribute the solution over the starch grain surfaces as evenly as possible. This mixture is then allowed to stand for several hours so that the solution and vapors therefrom may further distribute themselves. After this standing period, the mixture is placed on trays to a depth of about one-half inch or less and placed in a heating and drying oven. The starch is then maintained at a temperature of about 200° F. for two hours. The treated starch is then removed and cooled and neutralized with powdered soda ash or other alkali.

*Example 2*

Corn starch is agitated in the presence of formaldehyde gas and hydrochloric acid gas until an amount of each of the chemicals equivalent to the amounts given in Example 1 is adsorbed by the starch, after which the same steps are followed as given in Example 1.

*Example 3*

One hundred pounds of ordinary powdered corn starch is agitated in a mixer and while the starch is being agitated twelve pounds of formalin solution (37%) containing two-tenths pounds of concentrated hydrochloric acid is sprayed into the starch in a manner to distribute the solution as uniformly as possible. The mixture is then spread out in layers of several inches thickness or less and heated slowly to a temperature of 170° F. and after reaching that temperature, it is maintained for twenty-four hours or until the reaction is completed. The starch is then cooled, after which it is ready for use.

Considerable modification is possible in the conditions of reaction, as well as in the steps of the process, without departing from the essential features of the present invention.

I claim:

1. The process of preparing a starch product comprising unburst starch grains which will not burst, gelatinize, or swell appreciably upon exposure to boiling water and aqueous alkaline solutions, which comprises agitating unburst starch grains in the presence of free formaldehyde and acid to cause the formaldehyde and acid to be distributed throughout the starch grains and to be absorbed thereby, the amount of formaldehyde being between about 1% and about 15% on the dry basis of the weight of the starch, and the acid being sufficient to provide a pH in aqueous solution of between about 2.5 and 4, and reacting said starch with said formaldehyde and acid in the presence of not more than about 20% water based on the weight of the starch at a temperature above about 140° F. to remove moisture and to form unburst starch grains of the aforesaid properties in powdered form.

2. The process of claim 1 wherein the formaldehyde and acid are in the gaseous state and wherein the acid is a mineral acid.

3. The process of claim 1 wherein the formaldehyde and acid are in solution and the acid is a mineral acid.

4. The process of preparing a starch product comprising unburst starch grains which will not burst, gelatinize, or swell appreciably upon exposure to boiling water and aqueous alkaline solutions, which comprises agitating unburst starch grains in the presence of free formaldehyde and acid to cause the formaldehyde and acid to be distributed throughout the starch grains and to be absorbed thereby, the amount of formaldehyde being between about 3% and about 10% on the dry basis of the weight of the starch, and the acid being sufficient to provide a pH in aqueous solution of between about 2.5 and 4, and reacting said starch with said formaldehyde and acid in the presence of not more than about 20% water based on the weight of the starch at a temperature between about 150° F. and 220° F. to remove moisture and to form unburst starch grains of the aforesaid properties in powdered form.

5. The process of claim 4 wherein the formaldehyde and acid are in a gaseous state, wherein the acid is a mineral acid, and wherein the mixture of starch, formaldehyde, and acid are reacted at a temperature between about 180° F. and about 200° F.

6. The process of claim 4 wherein the formaldehyde and acid are in aqueous solution, wherein the acid is a mineral acid, and wherein the mixture of starch, formaldehyde, and acid are reacted at a temperature between about 180° F. and about 200° F.

GORDON G. PIERSON.

REFERENCES CITED

The following references are of record in the file of this patent:

UNITED STATES PATENTS

| Number | Name | Date |
|---|---|---|
| 982,673 | Herstein | Jan. 24, 1911 |
| 2,222,872 | Leuck | Nov. 26, 1940 |
| 2,113,034 | Rowland | Apr. 5, 1938 |

FOREIGN PATENTS

| Number | Country | Date |
|---|---|---|
| 522,732 | Br. | June 26, 1940 |

OTHER REFERENCES

Chem. Abst., vol. 23, page 2700. (Copy in S. L., U. S. Patent Office, Washington, D. C.)